US012643774B2

(12) United States Patent
Massey

(10) Patent No.: US 12,643,774 B2
(45) Date of Patent: Jun. 2, 2026

(54) WEAR PAD FOR A TELEHANDLER, WEAR PAD ARRANGEMENT, TELEHANDLER AND METHOD

(71) Applicant: Caterpillar Inc., Peoria, IL (US)

(72) Inventor: Andrew Massey, Matlock (GB)

(73) Assignee: Caterpillar Inc., Peoria, IL (US)

( * ) Notice: Subject to any disclaimer, the term of this patent is extended or adjusted under 35 U.S.C. 154(b) by 162 days.

(21) Appl. No.: 18/730,258

(22) PCT Filed: Jan. 23, 2023

(86) PCT No.: PCT/US2023/061053

§ 371 (c)(1),
(2) Date: Jul. 18, 2024

(87) PCT Pub. No.: WO2023/154614

PCT Pub. Date: Aug. 17, 2023

(65) Prior Publication Data

US 2025/0100854 A1 Mar. 27, 2025

(30) Foreign Application Priority Data

Feb. 9, 2022 (GB) ..................................... 2201655

(51) Int. Cl.
*B66C 23/70* (2006.01)
*F16C 29/02* (2006.01)
(52) U.S. Cl.
CPC ............ *B66C 23/707* (2013.01); *F16C 29/02* (2013.01); *F16C 2233/00* (2013.01)

(58) Field of Classification Search
CPC ...... B66C 23/707; B66F 9/0655; E02F 3/286; E02F 9/26; F16C 2233/00; F16C 29/02; F16D 66/027
See application file for complete search history.

(56) References Cited

U.S. PATENT DOCUMENTS

| | | | |
|---|---|---|---|
| 4,954,041 A | 9/1990 | Dahlquist et al. | |
| 7,270,890 B2 | 9/2007 | Sabol et al. | |

(Continued)

FOREIGN PATENT DOCUMENTS

| | | | |
|---|---|---|---|
| CN | 112840207 A | 5/2021 | |
| DE | 102018115872 A1 * | 1/2020 | ........... B66C 23/707 |

(Continued)

OTHER PUBLICATIONS

International Search Report related to Application No. PCT/US2023/061053 reported on May 16, 2023.

(Continued)

*Primary Examiner* — Omer S Khan

(57) ABSTRACT

The present disclosure is directed towards a wear pad for a telehandler. A pad body extends across a thickness between opposing sliding and mount surfaces. The sliding surface is configured for a sliding boom section to slide therealong. A wire conductor extends through the thickness of the pad body at a wear depth from the sliding surface. When the sliding boom section wears down the thickness of the pad body by the wear depth to contact the at least one wire conductor, the wire conductor conducts an electrical current from a power source to the sliding boom section. Also disclosed is a wear pad arrangement with a wear monitoring system, a telehandler with such an arrangement and a method of monitoring a wear pad of a telehandler.

12 Claims, 4 Drawing Sheets

(56)             References Cited

U.S. PATENT DOCUMENTS

| | | | |
|---|---|---|---|
| 8,801,354 | B2 | 8/2014 | Lettau et al. |
| 9,797,850 | B2 | 10/2017 | Izraili et al. |
| 11,029,275 | B2 | 6/2021 | Rhodes et al. |
| 2009/0223083 | A1 | 9/2009 | LeCrone |
| 2012/0251284 | A1* | 10/2012 | Lettau .................. B66F 9/0655 |
| | | | 384/42 |
| 2015/0152931 | A1* | 6/2015 | Moore .................. F16D 66/021 |
| | | | 188/1.11 L |
| 2021/0349046 | A1 | 11/2021 | Haschke et al. |
| 2022/0381647 | A1* | 12/2022 | Smith .................. G01M 13/04 |

FOREIGN PATENT DOCUMENTS

| | | | |
|---|---|---|---|
| DE | 102019008762 A1 | 6/2021 | |
| EP | 2691581 A2 | 2/2014 | |
| EP | 3385007 A1 | 10/2018 | |
| EP | 3587336 A1 | 1/2020 | |
| EP | 4001828 A1 | 5/2022 | |
| JP | H06193629 A | 7/1994 | |
| JP | H08012282 A | 1/1996 | |
| JP | 2008164377 A | 7/2008 | |
| JP | 2013088173 A | 5/2013 | |
| JP | 7172221 B2 | 11/2022 | |
| WO | 2017082735 A1 | 5/2017 | |
| WO | 2017109282 A1 | 6/2017 | |
| WO | 2020061634 A1 | 4/2020 | |
| WO | 2022003264 A1 | 1/2022 | |

OTHER PUBLICATIONS

Great Britain Search Report related to Application No. GB2201655.4 reported on Jun. 23, 2022.

\* cited by examiner

WEAR PAD FOR A TELEHANDLER, WEAR PAD ARRANGEMENT, TELEHANDLER AND METHOD

CROSS-REFERENCE TO RELATED APPLICATION

This application is a USC § 371 US National Stage filing International Application No. PCT/US2023/061053 filed on Jan. 23, 2023 which claims priority under the Paris Convention to Great Britain Patent Application 2201655.4 filed on Feb. 9, 2022.

TECHNICAL FIELD

This disclosure is directed towards a wear pad, particularly for a telehandler, a machine or telehandler comprising such a wear pad and a method of identifying the wear of a wear pad.

BACKGROUND

Machines, such as telehandlers, commonly comprise one or more sacrificial and replaceable wear pads for location between two in-contact moving parts. Telehandlers, also known as telescopic handlers or roto telehandlers, typically comprise an extendable boom or telescopic cylinder to which a work tool, such as a fork or bucket, can be attached. The extendable boom comprises a main boom section attached to the main body of the telehandler via a hinge and a telescopic boom section mounted in the main boom section. The telescopic boom section is slidable along the main boom section between retracted and extended orientations. The telehandler may have further telescopic boom sections mounted within another telescopic boom section.

One or more wear pads are located between the boom sections where they would otherwise contact one another and are configured to sacrificially wear during use. The wear pads are replaced during servicing or earlier if they reach their maximum wear. DE102018115872A1, published in the name of LIEBHERR WERK TELF GMBH, discloses wear detection devices to assist operators in the identification of the state of wear of a
sliding element having a sliding surface for guiding a movable telescopic section.

There is an ongoing need to improve the detection of the wear pads without direct visual inspection. A particular need is to reduce servicing costs, which can be relatively high due to the cost of the skilled labour required in the servicing of telehandlers. Furthermore, many telehandlers are rented to operators and thus reduced service or down time would be particularly beneficial.

SUMMARY

The present disclosure therefore provides a wear pad for a telehandler, the wear pad comprising: a pad body extending across a thickness between opposing sliding and mount surfaces, the sliding surface being configured for a sliding boom section to slide therealong; and a wire conductor extending through the thickness of the pad body at a wear depth from the sliding surface, wherein the wire conductor is configured for, when the sliding boom section wears down the thickness of the pad body by the wear depth to contact the at least one wire conductor, conducting an electrical current from a power source to the sliding boom section.

The present disclosure further provides a wear pad arrangement for a telehandler, the wear pad arrangement comprising: the aforementioned wear pad; a wear monitoring system comprising: a power source electrically connected to the or each wire conductor; and a detection system for detecting the conduction of electrical current from the power source through the sliding boom section by the or each wire conductor.

The present disclosure further provides a telehandler comprising a mount boom section, a sliding boom section and the aforementioned wear pad arrangement, wherein the wear pad is mounted to the mounted boom section and the sliding boom section is configured to slide relative to the mounted boom section along the sliding surface of the wear pad.

The present disclosure further provides a method of monitoring the wear of a wear pad of a telehandler, the wear pad comprising: a pad body extending across a thickness between opposing sliding and mount surfaces; and a wire conductor extending through the thickness of the pad body at a wear depth from the sliding surface, wherein the method comprises: sliding a sliding boom section along the sliding surface, thereby wearing down the thickness of the pad body; and when the sliding boom section wears down the thickness of the pad body by the wear depth, contacting the sliding boom section with the wire conductor and conducting an electrical current from a power source to the sliding boom section via the wire conductor.

BRIEF DESCRIPTION OF THE DRAWINGS

By way of example only, embodiments of the present disclosure are now described with reference to, and as shown in, the accompanying drawings, in which.

DETAILED DESCRIPTION

The present disclosure is generally directed towards a wear pad for a telehandler and a wear pad monitoring system for monitoring the wear of such a wear pad. The wear pad is located between boom sections sliding relative to one another and comprises a series of wear conductors at different wear levels. As the wear pad is worn through to the first wear conductor, current from a power source may be conducted through the first wear conductor and back to the power source via a ground return including the boom section sliding over the wear pad. The level of wear can be determined as the wear pad is worn further and each wear conductor sequentially contacts the sliding boom section to provide a ground return.

Figure 1:
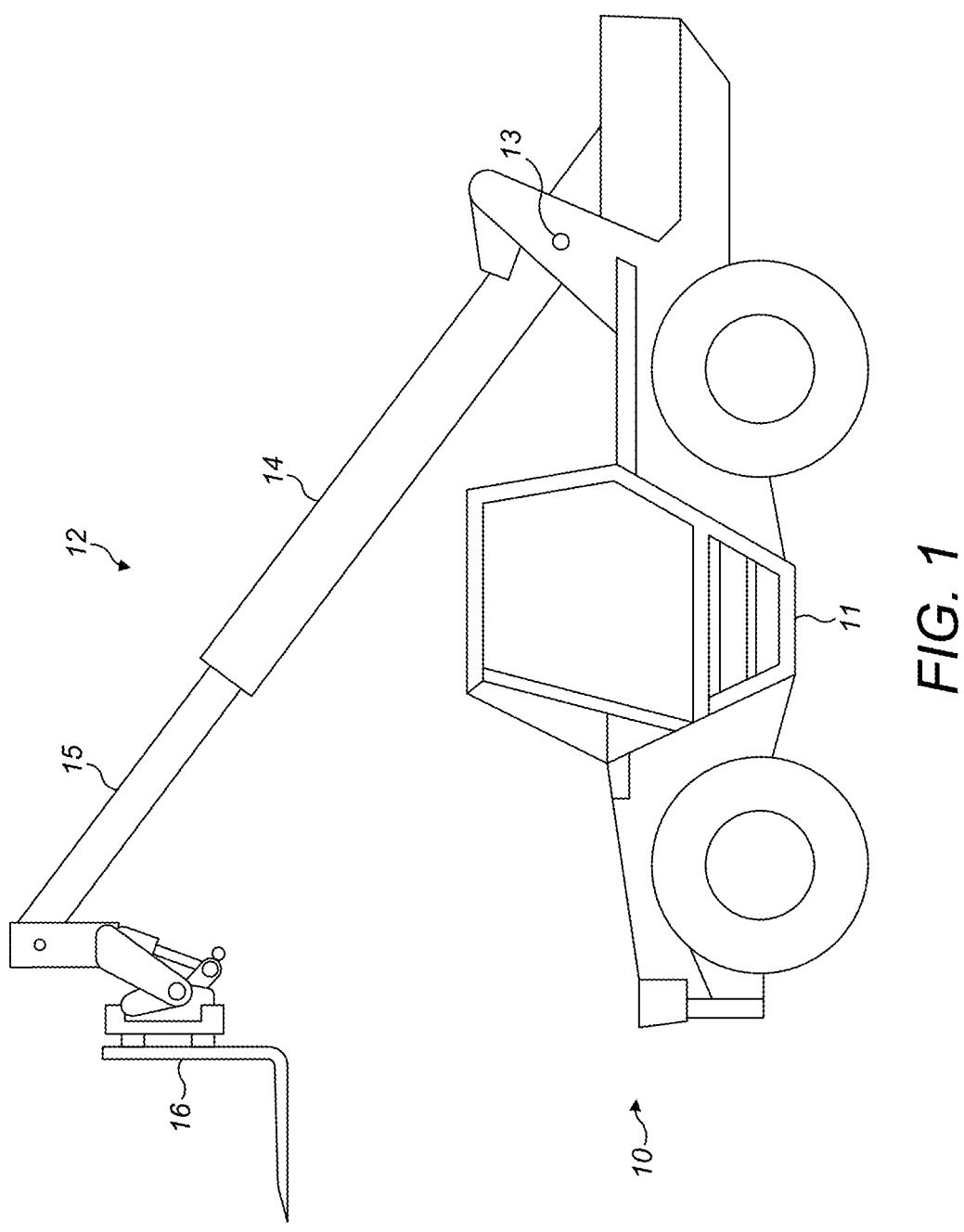
FIG. 1 is a schematic side elevation of a telehandler comprising a wear pad arrangement in accordance with the present disclosure.

FIG. 1 illustrates a telehandler 10 comprising the wear pad 20 of the present invention. The telehandler 10, also known as a telescopic handler, may be any type of telehandler, such as a roto or rotating telehandler. The telehandler 10 comprises a chassis or main body 11 and a boom 12 mounted thereto at a boom hinge 13. The boom 12 comprises a main boom section 14 and a telescopic boom section 15 mounted to the main boom section 14. A work tool 16, in this case a fork, is attached to the telescopic section 15 for performing work.

Figure 2:
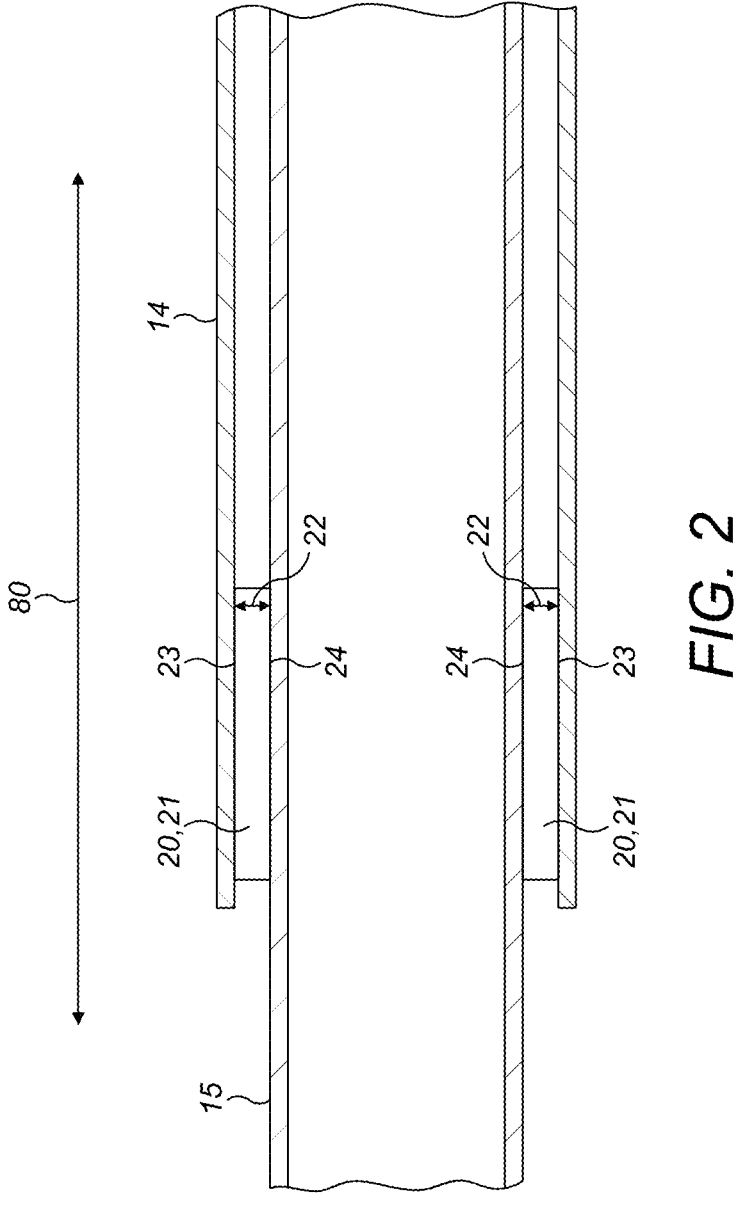
FIG. 2 is a cross-section side elevation of a portion of a boom of the telehandler of FIG. 1 showing wear pads of the wear pad arrangement.
Figure 4:
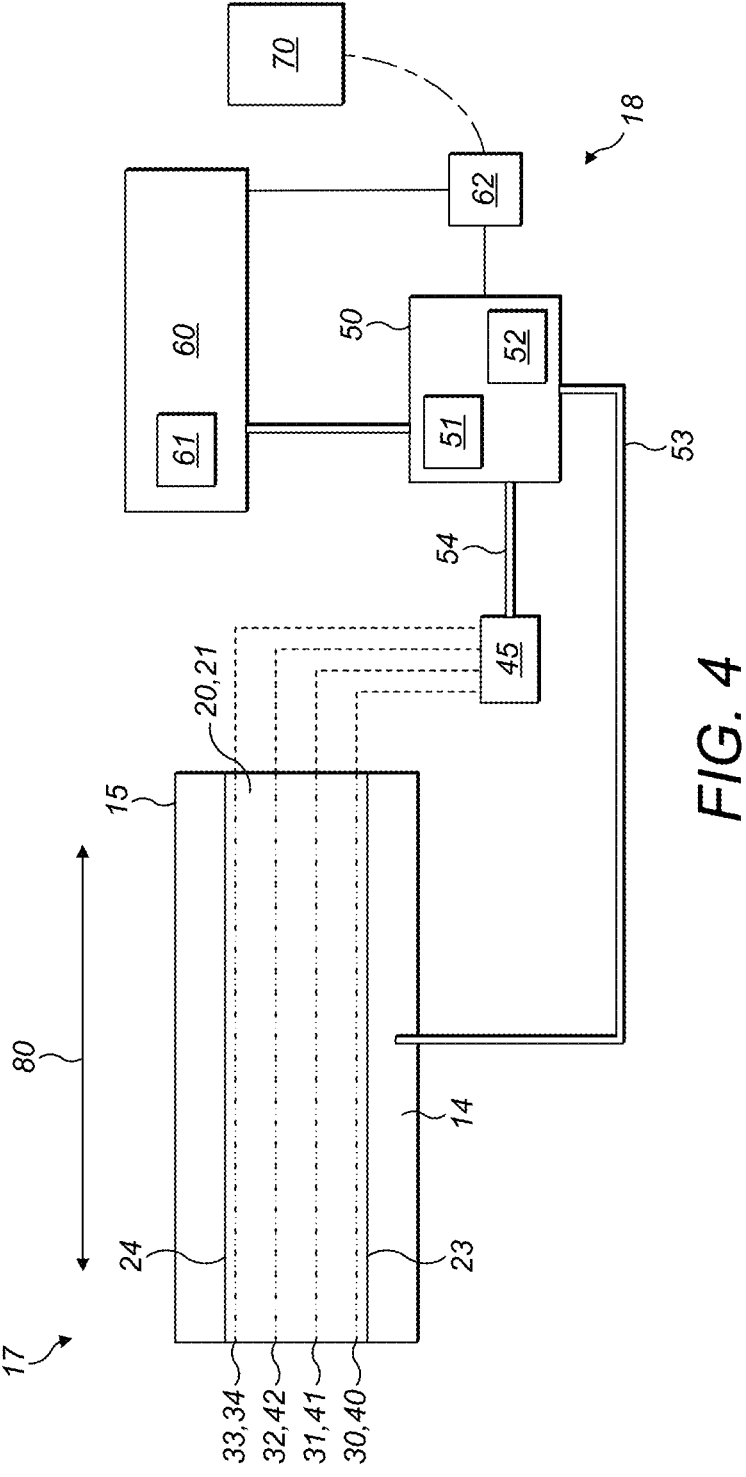
FIG. 4 is a schematic of the wear pad arrangement for the telehandler of FIG. 1.

As illustrated further in FIG. 2, the telescopic boom section 15 is retractably mounted inside the main boom section 14 such that the telescopic boom section 15 is slidable relative to the main boom section 14 along a sliding direction 80. The telehandler 10 comprises a wear pad arrangement 17 comprising a wear monitoring system 18 and at least one wear pad 20, as illustrated in FIG. 4.

The at least one wear pad 20 is located between boom sections 14, 15 and the boom sections 14, 15 may slide relative to one another along the wear pad 20. Typically the telehandler 10 and wear pad arrangement 17 comprise a plurality of wear pads 20 between the boom sections 14, 15. Two upper and lower wear pads 20 are illustrated, although further wear pads 20 may be located on the left and right side and the top and bottom of the main boom section 14. The following description in relation to a single wear pad 20 may equally apply to some or all of the other wear pads 20.

The wear pad 20 is mounted to the main boom section 14 such that the telescopic boom section 15 slides along it or the wear pad 20 is mounted to the telescopic boom section 15 such that the main boom section 14 slides along it. The boom section 14, 15 to which the wear pad 20 is mounted may be referred to as the pad mounted boom section 14, 15 and the boom section 14, 15 that slides along the wear pad 20 may be referred to as the sliding boom section 14, 15. There may be no contact between the boom sections 14, 15 during extension and retraction other than via the wear pad(s) 20.

Figure 3:
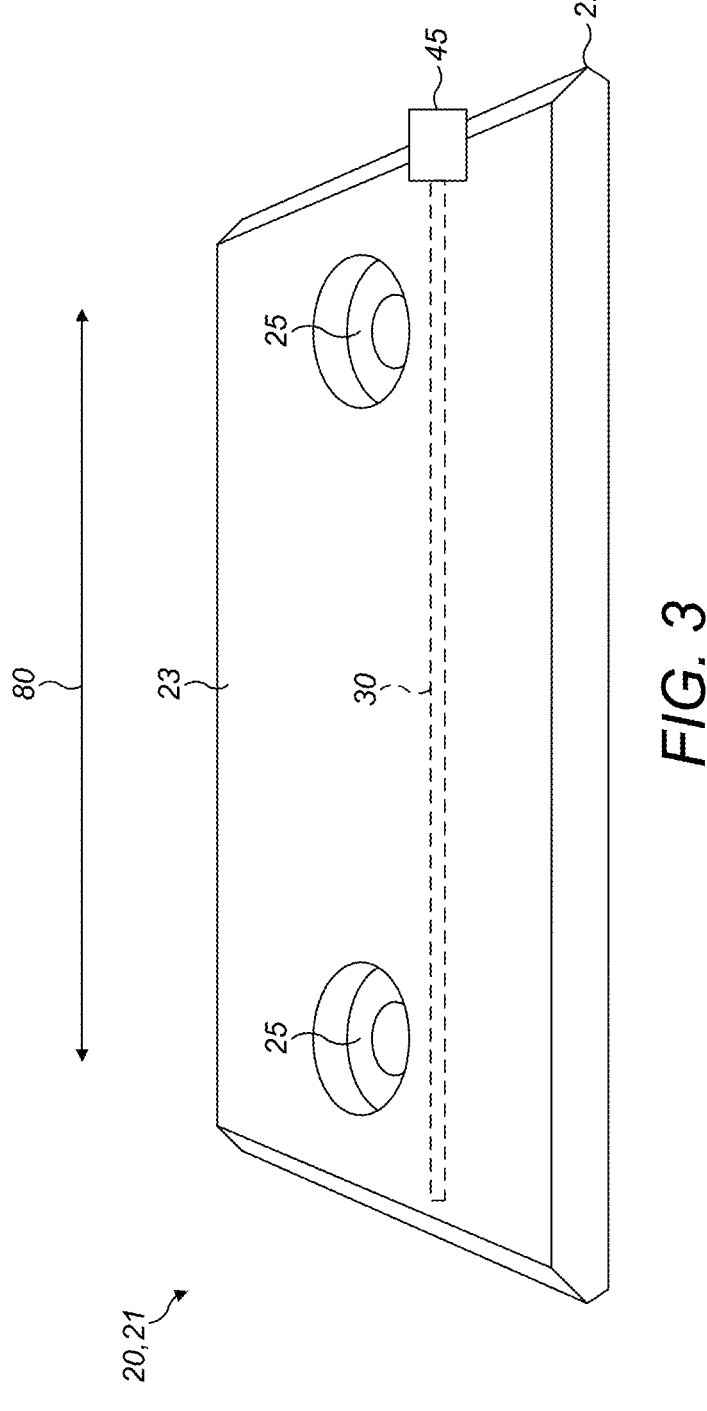
FIG. 3 is a perspective view of a wear pad for the telehandler of FIG. 1.

As shown in FIGS. 2 and 3, the wear pad 20 comprises a pad body 21 extending across a thickness 22 between a sliding surface 23, which is configured for the sliding boom section 14, 15 to slide therealong, and an opposing mount surface 24, which may face and be mounted to the pad mounted boom section 14, 15. Hence, the wear pad 20 is mounted to the pad mounted boom section 14, 15 and the sliding boom section 14, 15 is configured to slide relative to the pad mounted boom section 14, 15 along the sliding surface 23 of the wear pad 20, particularly in the sliding direction 80.

The wear pad 20 and pad body 21 may be a plate and the dimensions across the sliding and/or mount surfaces 23, 24 may be substantially greater than the thickness 22. The wear pad 20 may be elongate along the sliding direction 80 as illustrated. The sliding and/or mount surfaces 23, 24 may be substantially rectangular and the wear pad 20 and pad body 21 may be a substantially rectangular cuboid.

The wear pad 20 may be mounted into a pad mount (not illustrated), such as a recessed plate, the pad mount being attached to the pad mounted boom section 14, 15. The wear pad 20 may comprise at least one pad fixing 25, such as holes as illustrated in FIG. 3, for releasably mounting the wear pad 20 to the pad mount.

The pad body 21 comprises a suitable pad material for wearing away during use. The pad material may have a lower hardness than the boom sections 14, 15 such that it wears away rather than the sliding boom section 14, 15. The pad material may, for example, comprise nylon.

In use, the thickness 22 of the wear pad 20 reduces due to the sliding contact of the sliding boom section 14, 15 upon it. As illustrated in FIG. 4, the wear monitoring system 18 is connected to the wear pad(s) 20 and is arranged for detecting the wear of the wear pad(s) 20. In the present disclosure the term "wear" refers to a reduction in thickness from an original, predetermined and pre-installation thickness 22 due to the removal of the pad material during the sliding contact of the sliding boom section 14, 15 upon the wear pad 20.

The wear pad 20 comprises a wire conductor 30, 31, 32, 33 and the wire conductor 30, 31, 32, 33 extends through the thickness 22 of the pad body 21 at a wear depth 40, 41, 42, 43 from the sliding surface 23. The wire conductor 30, 31, 32, 33 is configured for, when the sliding boom section 14, 15 wears down the thickness 22 of the pad body 21 by the wear depth 40, 41, 42, 43, to contact the wire conductor 30, 31, 32, 33, conducting an electrical current from a power source 51 to the sliding boom section 14, 15. The sliding boom section 14, 15 may at least partially form a ground return to the power source 51.

As illustrated in FIG. 4, the wear pad 20 may comprise a plurality of wire conductors 30, 31, 32, 33 each extending through the thickness 22 of the pad body 21 at one of a plurality of wear depths 40, 41, 42, 43 from the sliding surface 23. If there are a plurality of wire conductors, 30, 31, 32, 33, each wire conductor 30, 31, 32, 33 may extend through the pad body 21 at a different wear depth 40, 41, 42, 43 to the other wire conductors 30, 31, 32, 33.

The plurality of wire conductors 30, 31, 32, 33 are configured for, when the sliding boom section 14, 15, wears down the thickness 22 of the pad body 21 by each of the wear depths 40, 41, 42, 43 to contact the respective wire conductor 30, 31, 32, 33, conducting an electrical current from the power source 51 to the sliding boom section 14, 15. Therefore, a detectable electrical current may be conducted each time a wire conductor 30, 31, 32, 33 is exposed by wear at the different wear depths 40, 41, 42, 43 during the lifetime of the pad body 21, enabling the determination of the wear of the wear pad 20. Each wire conductor 30, 31, 32, 33 will also be at least partially worn away during wear.

Prior to use and installation, the or each wire conductor 30, 31, 32, 33 is electrically insulated within the wear pad 20, such as from the wear material of the wear pad 20, conductors external to the wear pad 20 (other than via their connection to a power source 51 as discussed below) and, if present, from the other wire conductors 30, 31, 32, 33 in the wear pad 20.

As in the illustrated embodiment, the wear pad 20 may comprise at least first, second, third and fourth wire conductors 30, 31, 32, 33 each extending through the thickness 22 of the pad body 21 at first, second, third and fourth wear depths 40, 41, 42, 43 respectively from the sliding surface 23.

The first depth 40 may be at about 25% of the thickness 22 from the sliding surface 23. The second depth 41 may be at 50% of the thickness 22 from the sliding surface 23. The third depth 42 may be at 75% of the thickness 22 from the sliding surface 23. The fourth depth 43 may be at or adjacent to the mount surface 24. Such measurements may be taken before the wear pad 20 is installed and before wear begins.

The wear pad 20 may comprise further wire conductors 30, 31, 32, 33 located at different wear depths 40, 41, 42, 43 or may comprise less than four of the first, second, third and fourth wire conductors 30, 31, 32, 33. For example, the wear pad 20 may comprise the fourth wire conductor 33 for determining that full wear has occurred and optionally may comprise one or more further wire conductors 30, 31, 32.

The wire conductor(s) 30, 31, 32, 33 may be embedded in the thickness 22 of the pad body 21 substantially parallel to the sliding and mount surfaces 23, 24. The wire conductor(s) 30, 31, 32, 33 may be directly embedded in the pad body 21 such that the wire conductor(s) 30 contact only the wear material in the pad body 21. The or each wire conductor 30, 31, 32, 33 may comprise metal, such as copper, wire, which may be exposed without an insulating sheath or sleeve. The wire conductor(s) 30, 31, 32, 33 may be formed in the pad body 21 during its formation, such as the pad material being moulded around them. Alternatively, the wire conductor(s) 30, 31, 32, 33 may be formed in the pad body 21 after its formation, for example by sealing them in holes through the pad body 21.

The wear pad arrangement 17 may further comprise at least one wire conductor connector 45 conductively connected to the at least one wire conductor 30, 31, 32, 33. The at least one wire conductor connector 45 is configured for electrically connecting the power source 51 to the at least one wire conductor 30, 31, 32, 33.

The at least one wire conductor connector 45 may form part of the wear pad 20, as illustrated in FIG. 3, and may be mounted to the pad body 21. Alternatively, as illustrated in FIG. 4, the at least one wire conductor connector 45 may be part of the wear monitoring system 18 and the at least one wire conductor 30, 31, 32, 33 may extend outwardly from the pad body 21 (such as with insulation thereround outside of the pad body 21) for connection to the at least one wire conductor connector 45 during installation. The at least one wire conductor connector 45 may be a harness connector of a harness 54, such as that of the boom 12 or main body 11.

The wear pad 20 may be configured so that no ground return is provided (i.e. to a power source configured to supply electrical current to the or each wire conductor 30, 31, 32, 33) from the or each wire conductor 30, 31, 32, 33 other than via the sliding boom section 14, 15 when the sliding boom section 14, 15 contacts the or each wire conductor 30, 31, 32, 33. The wire conductor(s) 30, 31, 32, 33 may terminate within the pad body 21 and may extend from an end at the at least one conductor connector 45 to an opposing end terminating within the pad body 21. In particular, the or each wire conductor 30, 31, 32, 33 may comprise a metal wire extending from an edge of the pad body 21 into the pad body 21 and terminating in the pad body 21.

The wire conductor(s) 30, 31, 32, 33 may extend elongately or longitudinally along and/or parallel to the sliding direction 80 (i.e. the relative direction of sliding between the sliding and pad mounted boom sections 14, 15) within the pad body 21. As a result, any uneven wear of the wear pad 20 in the sliding direction 80 can be detected. The wear pad 20 may be particularly prone to such uneven wear because the boom sections 14, 15 may pivot and apply a higher force at different locations of the wear pad 20 along the sliding direction 80.

The wear monitoring system 18 is configured to connect to the wear pad 20 and supply and receive current to and from the wire conductor(s) 30, 31, 32, 33. In particular, the wear monitoring system 18 comprises the power source 51, which is electrically connected to the wire conductor(s) 30, 31, 32, 33 for supplying electrical power thereto, and a detection system 52 for detecting the conduction of electrical current from the power source 51 through the sliding boom section 14, 15 by the wire conductor(s) 30, 31, 32, 33.

The wear monitoring system 18 may comprise a controller 50, such as an engine control unit or auxiliary engine control unit, and the controller 50 may comprise the power source 51 and detection system 52. The detection system 52 may be any sensor, driver or the like that can detect the presence of the current.

The wear pad arrangement 17 comprises a ground return path from the wire conductor(s) 30, 31, 32, 33, through the sliding boom section 14, 15 and to the power source 51. The wear monitoring system 18 may comprise a ground return harness 53 connected between the power source 51 or controller 50 and the sliding boom section 14, 15. The ground return harness 53 may be a common return from the boom 12.

The wear monitoring system 18 may comprise a main harness 54 extending between the power source 51 or controller 50 and the at least one wire conductor connector 45 for conducting electrical current from the power source 51 to the wire conductor(s) 30, 31, 32, 33. The main harness 54 may be connected to the controller 50 via different input/output pins of the controller 50, with a separate input/output pin for each wire conductor(s) 30, 31, 32, 33. Each wire conductor(s) 30, 31, 32, 33 may therefore be configured to independently and separately receive current from the power source 51 or controller 50.

The wear pad arrangement 17, particularly the wear monitoring system 18, may further comprises an alert system 60 for alerting an operator when the wire conductor(s) 30, 31, 32, 33 conducts the electrical current from the power source 51 to the sliding boom section 14, 15. The alert system 60 may be connected to the controller 50 and may receive signals from the detection system 52 indicative as to whether current has been conducted through the wire conductor(s) 30, 31, 32, 33 to the ground return path. The alert system 60 may comprise an alert device 61, such as a display, gauge, light or the like, for informing the operator of the status of the wear pad 20.

The wear pad arrangement 17 may comprise a communication device 62 for wirelessly communicating information relating to the wear of the wear pad(s) 20 to a remote computing system 70. The communication device 62 may be a transceiver and may be connected to or form part of the controller 50 and/or alert system 60. The information or data relating to the wear of the wear pad(s) 20 may be stored on the controller 50 and/or communicated via the communication device 62 to the remote computing system 70. The wear data may store the amount of wear or wear depth 40, 41, 42, 43 and time at which the amount of wear or wear depth 40, 41, 42, 43 was reached. The remote computing system 70 may be that of the owner, manufacturer and/or supplier of the telehandler 10 and the wear data may be utilised to track the wear across multiple telehandlers 10. The wear data may be utilised in the controller 50 and/or remote computing system 70 to determine the rate of wear through the wear depths 40, 41, 42, 43.

In the method of monitoring the wear of the wear pad 20, the sliding boom section 14, 15 is slid along the sliding surface 23, thereby wearing down the thickness 22 of the pad body 21. When the sliding boom section 14, 15 wears down the thickness 22 of the pad body 21 by the wear depth 40, 41, 42, 43, the sliding boom section 14, 15 contacts the wire conductor 30, 31, 32, 33 at the wear depth 40, 41, 42, 43. The wire conductor 30, 31, 32, 33 conducts an electrical current from a power source 51 to the sliding boom section 14, 15 via the wire conductor 30, 31, 32, 33. Once the electrical current is conducted, the method may comprise alerting the operator.

As the sliding boom section 14, 15 wears sequentially through the wear depths 40, 41, 42, 43 is will at least partially wear through the wire conductors 30, 31, 32, 33. Hence a current will be conducted sequentially through each wire conductor 30, 31, 32, 33 in the order of the wear depths 40, 41, 42, 43 at which they are located. For example, the current may be conducted sequentially through the first, second, third and fourth wire conductors 30, 31, 32, 33 due to sequential wear of pad body 21 to the first, second, third and fourth wear depths 40, 41, 42, 43.

In each case, the sliding boom section 14 at least partially forms the ground return path to the power source 51 or controller 50 and the ground return harness 53 may also form the ground return path.

The detection system 52 or controller 50 may detect the conduction of the current through each wire conductor 30, 31, 32, 33. The controller 50 may log the time of the first conduction of current through each wire conductor 30, 31, 32, 33 and store it on a local memory and/or on the remote computing system 70.

Upon detection of the conduction of current, the alert system 60 may receive data from the detection system 52 or controller 50 and may alert the operator via the alert device 61 of the wear depth 40, 41, 42, 43 reached. For example, the alert device 61 may be a display that graphically shows the wear depth 40, 41, 42, 43 reached (e.g. shows 25%, 50%, 75% and/or 100% worn).

When current is first conducted through the first wire conductor 30 at the first wear depth 40 (e.g. at 25% worn), no alert may be provided to the operator by the alert system 60. The reaching of the first wear depth 40 may be stored in the controller 50 and the operator may be able to identify that the wear pad 20 is 25% worn in, for example, a settings or vehicle information menu of a display 61.

When current is first conducted through the second wire conductor 31 at the second wear depth 41 (e.g. at 50% worn), a second wear depth alert may be provided to the operator by the alert system 60. The second wear depth alert may only be shown on the alert device 61 at start up of the telehandler 10.

When current is first conducted through the third wire conductor 32 at the third wear depth 42 (e.g. at 75% worn), a third wear depth alert may be provided to the operator by the alert system 60. The third wear depth alert may be shown on the alert device 61 only at start up and/or continually during use of the telehandler 10 and may be visually different to that of the second wear depth alert (e.g. a different colour of light).

When current is first conducted through the fourth wire conductor 32 at the fourth wear depth 42 (e.g. at almost 100% or 100% worn), a fourth wear depth alert may be provided to the operator by the alert system 60. The fourth wear depth alert may be shown continually during use of the telehandler 10 and may be visually different to that of the second and/or third wear depth alert. The fourth wear depth alert may indicate to the operator that they must stop using the boom 12 and/or telehandler 10.

At each wear depth 40, 41, 42, 43, wear data indicating that the wear pad 20 has reached the respective wear depth 40, 41, 42, 43 may be communicated to the remote computing system 70 where it may be stored with the time it was reached.

INDUSTRIAL APPLICABILITY

By virtue of being able to intelligently track the wear of the wear pad 20, the need to manually check the wear is avoided. This reduces downtime, costs and also means that the need to replace the wear pad 20 can be identified early on without a manual check.

The incorporation of multiple wire conductors 30, 31, 32, 33 at sequential wear depths 40, 41, 42, 43 means that the wear of the wear pad 20 can be closely tracked and servicing scheduled appropriately. Furthermore, uses resulting in high rates of wear of the wear pad 20 can be identified.

In addition, the wear data on the controller 50 or remote computing system 70 can be used to automatically identify when to order new wear pads 20 in advance of them needing replacing and the wear tracked remotely, such as by a telehandler owner renting the telehandler 10 to operators.

The invention claimed is:

1. A wear pad monitoring system for a telehandler, comprising:
    a wear pad, comprising:
        a pad body extending across a thickness between opposing sliding and mount surfaces, the sliding surface being configured for a sliding boom section to slide therealong; and
        a wire conductor extending through the thickness of the pad body at a wear depth from the sliding surface, wherein the wire conductor is configured to, when the sliding boom section wears down the thickness of the pad body by the wear depth, contact the sliding boom section;
    a wear monitoring system, comprising:
        a power source electrically connected to the wire conductor; and
        a detection system for detecting conduction of electrical current from the power source through the sliding boom section by the wire conductor; and
    an alert system for alerting an operator when the detection system detects the conduction of electrical current from the power source through the sliding boom section by the wire conductor.

2. The wear pad monitoring system as claimed in claim 1, wherein the wire conductor comprises a plurality of wire conductors each extending through the thickness of the pad body at one of a plurality of wear depths from the sliding surface, wherein the plurality of wire conductors are configured for, when the sliding boom section wears down the thickness of the pad body by each of the wear depths to contact the respective wire conductor, conducting an electrical current from a power source to the sliding boom section.

3. The wear pad monitoring system as claimed in claim 2, comprising at least first, second, third and fourth wire conductors each extending through the thickness of the pad body at first, second, third and fourth wear depths respectively from the sliding surface, wherein the first depth is at 25% of the thickness from the sliding surface, the second depth is at 50% of the thickness from the sliding surface, the third depth is at 75% of the thickness from the sliding surface and the fourth depth is at or adjacent to the mount surface.

4. The wear pad monitoring system as claimed in claim 1, wherein the wire conductor is embedded in the thickness of the pad body substantially parallel to the sliding and mount surfaces.

5. The wear pad monitoring system as claimed in claim 1, further comprising a wire conductor connection at least partially externally mounted to the pad body, wherein the wire conductor connection is conductively connected to the wire conductor and configurable for connection to a power source.

6. The wear pad monitoring system as claimed in claim 1, wherein the wear pad is configured so that no ground return is provided from the wire conductor other than via the sliding boom section when the sliding boom section contacts the wire conductor.

7. The wear pad monitoring system as claimed in claim 1, wherein the sliding surface is configured for a sliding boom section to slide therealong along a sliding direction and the wire conductor extends through the pad body longitudinally in the sliding direction.

8. The wear pad monitoring system as claimed in claim 5, further comprising a controller configured to control the power source and the detection system.

9. The wear pad monitoring system as claimed in claim 5, further comprising a ground return path from the wire conductor, through the sliding boom section and to the power source.

10. The wear pad monitoring system as claimed in claim 5, further comprising a harness for conducting electrical current from the power source to the wire conductor.

11. A telehandler comprising a mount boom section, a sliding boom section and the wear pad monitoring system of claim 1, wherein the wear pad is mounted to the mounted boom section and the sliding boom section is configured to slide relative to the mounted boom section along the sliding surface of the wear pad.

12. A method of monitoring the wear of a telehandler wear pad, the method comprising:

sliding a sliding boom section of a boom of the telehandler over the telehandler wear pad, such that a sliding surface of the sliding boom section contacts the telehandler wear pad and thereby wears down a thickness of the telehandler wear pad;

passing an electrical current through a wire conductor extending through the telehandler wear pad at a wear depth from the sliding surface, detecting when the sliding boom section wears down the thickness of the wear pad to the wear depth and the sliding boom section contacts the wire conductor; and alerting an operator of the telehandler when the sliding boom section contacts the wire conductor;

wherein the telehandler wear pad comprises:

a pad body extending across a thickness between opposing sliding and mounting surfaces; and a wire conductor extending through the thickness of the pad body at a wear depth from the sliding surface;

a wire conductor connection at least partially externally mounted to the pad body.

\* \* \* \* \*